United States Patent
Engel et al.

(10) Patent No.: US 7,460,117 B2
(45) Date of Patent: Dec. 2, 2008

(54) SLIDING TEXTURE VOLUME RENDERING

(75) Inventors: Klaus D. Engel, West Windsor, NJ (US); Gianluca Paladini, Skillman, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 384 days.

(21) Appl. No.: 11/132,541

(22) Filed: May 19, 2005

(65) Prior Publication Data
US 2005/0264578 A1   Dec. 1, 2005

Related U.S. Application Data

(60) Provisional application No. 60/574,038, filed on May 25, 2004.

(51) Int. Cl.
*G06T 15/00* (2006.01)
(52) U.S. Cl. .............. 345/419; 345/420; 345/421; 345/422; 345/423; 345/424; 345/582; 345/583; 345/607; 345/608; 345/609; 345/613; 345/623
(58) Field of Classification Search .............. 345/419, 345/420, 421, 422, 423, 424, 582, 583, 607, 345/608, 609, 613, 623
See application file for complete search history.

(56) References Cited

U.S. PATENT DOCUMENTS

| | | | |
|---|---|---|---|
| 6,570,952 B2 | 5/2003 | Paladini | |
| 6,852,081 B2 | 2/2005 | Sumanaweera et al. | |
| 7,133,041 B2 * | 11/2006 | Kaufman et al. | 345/419 |

OTHER PUBLICATIONS

"Memory Organization for a Cubic Frame Buffer," by Arie Kaufman, in Proc. Eurographics '86, Lisbon, Portugal, pp. 93-100 (Aug. '86).*
William E. Lorensen , Harvey E. Cline, Marching cubes: A high resolution 3D surface construction algorithm, ACM SIGGRAPH Computer Graphics, v.21 n.4, p. 163-169, Jul. 1987.*

(Continued)

*Primary Examiner*—Kimbinh T Nguyen
(74) *Attorney, Agent, or Firm*—Donald B. Paschburg

(57) ABSTRACT

Subsets of volume data are sequentially stored for volume rendering from two dimensional textures. For example, pairs of adjacent two-dimensional images are loaded into RAM or cache. One or more strips of texture data are interpolated for polygons extending between the two-dimensional images. The strips or polygons are more orthogonal to a viewing direction than the two-dimensional images. After interpolating texture data from the two-dimensional images for a plurality of non-coplanar polygons, the texture data is rendered. The rendered information represents one portion of the three dimensional representation. Other portions are rendered by repeating the process for other pairs or subset groups of adjacent two-dimensional images. A lower cost apparatus, such as a programmed computer or a GPU with a limited amount of memory, is able to render images for three dimensional representations of very large three-dimensional arrays. The images may be rendered without copying volume data for different main axes. Different scaling or varying spatial relationships between the two-dimensional images representing the volume may be used. The polygons are varied to account for the differences, avoiding computationally intensive resampling.

29 Claims, 1 Drawing Sheet

OTHER PUBLICATIONS

Marc Levoy, *A Hybrid Ray Tracer for Rendering Polygon and Volume Data*, IEEE Computer Graphcis and Applications, pp. 33-40, Mar. 1990.

Marc Levoy, *Efficient Ray Tracing of Volume Data*, ACM Transactions on Graphics, 9(3):245-261, Jul. 1990

"Accelerated Volume Rendering and Topographic Reconstruction Using Texture Mapping Hardware," by B. Cabral, N.Cam and J.Foran, ACM Symposium on Volume Visualization, 1994.

"Interactive Volume Rendering on Standard PC Graphics Hardware Using Multi-Textures and Multi-Stage Rasterization," by C. Rezk-Salama, K. Engel, M. Bauer, G.Greiner and T. Ertl, In Euro-graphics/SIGGRAPH Workshop on Graphics Hardware, 2000, pp. 109-118, 147. Addison-Wesley Publishing Company, Inc. 2000.

"A Practical Evaluation Of Four Popular Volume Rendering Algorithms," by M. Meissner, J. Huang, D. Bartz, K. Mueller and R. Crawfis, Proceedings of IEEE Symposium on Volume Visualization, pp. 81-90, 2000.

"Optical Models for Direct Volume Rendering," by N. Max, IEEE Transactions on Visualization and Computer Graphics, pp. 99-108, 1995.

\* cited by examiner

SLIDING TEXTURE VOLUME RENDERING

RELATED APPLICATIONS

The present patent document claims the benefit of the filing date under 35 U.S.C. § 119(e) of Provisional U.S. patent application Ser. No. 60/574,038, filed May 25, 2004, which is hereby incorporated by reference.

BACKGROUND

This present invention relates to generating data for volume rendering. Direct volume rendering includes several different techniques, roughly classified as image-based (backward projective), e.g., ray-casting, and object-based (forward projective), e.g., cell projection, shear-warp, splatting, or texture-based algorithms. The common theme is integration along viewing lines of data (e.g., RGBα values) within a volume for each pixel of a three dimensional representation.

Direct volume rendering is provided for medical images, such acquired with Magnetic Resonance (MR), Computed Tomography (CT), Positron Emission Tomography (PET), or any other medical tomographic scanner capable of producing a series of images in a grid-like array. Recent technological advances in the field of tomographic imaging have greatly improved the spatial resolution and speed of data acquisition, resulting in the production of very large datasets composed of hundreds, and even thousands of images. For example, it is possible to rapidly generate a sequence of 1024 images using the Siemens SOMATOM VolumeZoom™ CT scanner, with each image being composed of a grid of 512×512 picture elements, resulting in a three-dimensional volume of 512×512×1024 volume elements (over 268 million data values). In the Oil and Gas industry, seismic data measurements are also stored in very large three-dimensional volumes, with as many as 2048×2048×2048 grid elements (over 8.5 billion data values).

Direct volume rendering may require random access to the data values of the three-dimensional array, and therefore the entire array is stored in the computer's RAM or graphics processing unit (GPU) memory. Such an enormous amount of data is often larger than the random-access memory (RAM) storage available on modern computers. In order to compute direct volume renderings of very large volumes, a costly apparatus with very large amounts of RAM is used.

When using a 32-bit CPU, the size of array used for direct volume rendering is limited to the maximum number of data elements addressable by the CPU. Some three-dimensional arrays can be so large that their size exceeds the memory addressing capability of 32-bit central processing units (CPU) found in many personal computers and graphic workstations, which is limited to a maximum of 4.2 billion data elements.

Volume rendering methods may also require resampling the volume data into a uniform Cartesian grid. The images all have the same resolution and dimensions, and the distance between adjacent images is constant for the complete set of volume data.

The data for the volume can be stored in a single 3D texture, and three texture coordinates from the vertices of the slices are interpolated over the inside of the slice polygons. The three texture coordinates are employed during rasterization for fetching filtered pixels from the 3D texture map. Depending on the size of the 3D texture, cache performance of the CPU or GPU will suffer. It is also possible to decompose the volume into several smaller 3D textures (bricks) to increase cache performance. However, to ensure contiguous interpolation between bricks, the volume data has to be replicated on the boundaries of bricks. As caches in CPUs and GPUs are relatively small, the volume data is broken down into a large number of bricks to ensure optimal cache performance. A lot of volume data is replicated on the brick boundaries, which is not a practical solution for large volume data. Additionally, the data must be rearranged in memory from the original representation as a stack of slices.

An alternative approach is to store volume data as a number of two-dimensional images (2D textures). A single image of the volume data is rather small compared to the complete volume. Rendering a single two-dimensional texture at a time yields good cache performance. However, this approach requires three copies of the volume data to be stored in memory, where each copy is oriented with one of the three main axes of the volume data. The copy of the volume data with a main axis most perpendicular to the viewer's line of sight is used for rendering to ensure good memory access patterns and cache coherency.

BRIEF SUMMARY

By way of introduction, the preferred embodiments described below include a method and systems for generating data for volume rendering. Subsets of the volume data are sequentially stored for volume rendering from two dimensional textures. For example, pairs of adjacent two-dimensional images are loaded into RAM or cache. One or more strips of texture data are interpolated for polygons extending between the two-dimensional images. The strips or polygons are more orthogonal to a viewing direction than the two-dimensional images. After interpolating texture data from the two-dimensional images for a plurality of non-coplanar polygons, the texture data is rendered. The rendered information represents one portion of the three dimensional representation. Other portions are rendered by repeating the process for other pairs or subset groups of adjacent two-dimensional images.

A lower cost apparatus, such as a programmed computer or a GPU with a limited amount of memory, is able to render images for three dimensional representations of very large three-dimensional arrays. The images may be rendered without copying volume data for different main axes. Different scaling or varying spatial relationships between the two-dimensional images representing the volume may be used. The polygons are varied to account for the differences, avoiding computationally intensive resampling.

In a first aspect, a method is provided for generating data for volume rendering. At least first and second two dimensional textures are obtained. Texture data more orthogonal to a viewing direction than the two dimensional textures is generated from the first and second two dimensional textures. The texture data represents an area between first and second two dimensional textures.

In a second aspect, a method is provided for volume rendering from two dimensional textures. Polygons extending as strips between adjacent two dimensional textures are identified. Texture data is generated for the polygons. An image is rendered from the texture data for the polygons.

In a third aspect, a system is provided for generating data for volume rendering. A memory is operable to sequentially store different subsets of a plurality of two dimensional images. A processor is operable to generate texture data on at least one strip representing an area between the two dimensional images of each different subset for each different subset. The texture data for each different subset is a function from the two dimensional images of the respective different subset.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A volumetric data set is addressed by a moving window, rendering the space (volume slab) in between two adjacent images at a time. Two adjacent images are streamed from any storage device or network connection into local CPU or GPU memory. The space in between the two adjacent images is rendered by rasterizing a series of slab polygons that are textured with interpolated data from the two adjacent images. After slab polygons for the given slab have been rendered, an adjacent slab is sequentially rendered. An additional image is streamed into the local memory replacing one of the previous images that does not bound the new slab. This procedure is repeated until the whole series of images of the volume or array has been processed.

An image is generated efficiently using direct volume rendering, even when the entire three-dimensional array containing the data being interpolated is extremely large and exceeds the memory storage and/or memory addressing capabilities of the processing apparatus. The adjacent images of the object are traversed progressively one at a time and interpolated using image pairs or other subset. The storage memory requirements of any apparatus used for the visualization of large volume data can be greatly reduced, because only two images need to reside in memory at any time, and each image is loaded in memory only once. The low memory requirements allow a simple processing apparatus, such as a computer with limited memory or a GPU with little video memory, to compute direct volume visualizations of very large three-dimensional volumes containing an arbitrarily large number of images. The inter-image distance and image-scaling may be arbitrary, allowing for the visualization of volumetric data sets with locally varying resolution without having to re-sample the data on a Cartesian grid.

Figure 1:
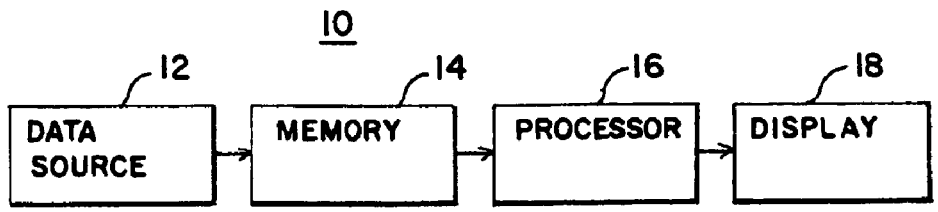
FIG. 1 is a block diagram of one embodiment of a system for generating texture data for volume rendering.

FIG. 1 shows a system 10 for generating data for volume rendering and volume rendering the generated data. The system 10 includes a data source 12 a memory 14, a processor 16 and a display 18. Additional, different or fewer components may be provided, such as the system without the data source 12. In one embodiment, the system 10 is part of a medical imaging or tomographic scanning systems, such as a MRI, CT, x-ray, PET, ultrasound or other modality of medical imaging. In other embodiments, the system 10 is a computer, workstation, database system or other free standing or mobile processing system.

The data source 12 is a medical imaging system, tomographic scanner, network, databases storage device, computer or other device operable to acquire and/or store a set of data representing a volume. For example, the data source 12 simultaneously or sequentially provides tens, hundreds or even thousands of two dimensional images and associated spatial relationship information. Images include data for generating an image even if not in an imaging format or data in an imaging format previously or not yet used to display an image. The array of two dimensional images represents parallel or non-parallel slices or planes through a patient or structure. The images have a same or different resolution with the sante or varying spacing between each immediately adjacent pair of images. Any now known or later developed data source 12 and associated array or set of two dimensional textures (images) may be used.

The memory 14 is a cache memory, random access memory, CPU memory, GPU memory, buffer, combinations thereof or other now known or later developed memory. The memory 14 is operable to sequentially store different subsets of the data representing the volume. For example, the memory 14 stores two or more images from a larger number of two dimensional images. The stored images are adjacent to each other, such as being an immediately adjacent pair of images. Alternatively, relatively adjacent images spaced apart by one or more other images are stored.

For rendering with a sliding window to select sequential storage of subsets of images from the volume data, the memory 14 is operable in a first-in first-out format. Other formats may be used. The sliding texture approach circumvents the problems of using two dimensional textures for volume rendering. In particular, the sliding texture approach does not require three copies of the volume data to be stored, but multiple copies may be used. The volume data can be represented in an original form as a single series of two-dimensional images. The data contents of each image are contiguous within the memory 14 to ensure good cache coherency, but one or more images with data in non-contiguous addresses may be used. The images may be stored in different memories (e.g., data source 12 and the memory 14) and the images may lack uniform scaling and/or inter-image distance.

The processor 16 is a general processor, digital signal processor, application specific integrated circuit, field programmable gate array, graphics processor unit, central processing unit, analog circuit, digital circuit, combinations thereof, multiple processors, network or other now known or later developed processor. In one embodiment, the processor and the memory 14 are part of a graphics processing unit, such as a graphics card operable pursuant to OpenGL, DirectX, or other graphical data rendering languages.

The processor 16 is operable to tri-linearly interpolate data from the different subsets of two dimensional textures stored in the memory 14. For example, the processor 16 first bi-linearly interpolates. The processor 16 generates texture data on at least one strip representing an area between the two dimensional images of each different subset. The texture data is generated from the two dimensional images bounding the area, so the texture data for each different subset is a function from the two dimensional images of the respective different subset. Different texture strips representing the slab are generated. For each pair or subset of two-dimensional images currently stored in the memory 14, a plurality of substantially parallel, non-coplanar polygons extending between the two-dimensional images are identified and texture data is interpolated from the pair of two dimensional images on the polygons.

For rendering from the texture strips, the processor 16 interpolates along another dimension more orthogonal than parallel to the texture strips, providing the tri-linear interpolation. By sequentially performing the tri-linear interpolation for different subsets of the volume data, the processor 16 renders a three dimensional representation having different areas rendered from different strips corresponding to the different subsets.

In one example GPU implementation, the volume data is stored in the memory 14. If the complete set of volume data fits into the GPU memory 14, the complete sequence of slices S1-Sn is stored as a stack of 2D textures. Alternatively, another subset of 2D textures (e.g., T1 and T2) is allocated in the GPU memory 14. Whether as a complete set or a subset, two or more images are selected to define each volume slab. A template geometry is pre-computed or polygons are identified in real time. The polygons from the template or as calculated are stored in GPU memory using display lists, vertex buffer objects (VBOs), vertex arrays (VARs) or any other technique that allows storing geometry in GPU memory. The images of the subset are bound as multi-textures units (e.g., TU1 and TU2) and used for texturing in a proxy geometry (e.g., the translated template geometry). A programmable fragment processor fetches two bi-linearly interpolated samples from the two images comprising the slab. The fragment processor weights the two samples with the interpolation factor in the z-texture coordinate to obtain a tri-linearly interpolated sample. This sample can further be used for classification and shading.

After the first slab has been rendered, a translation by the inter-slice distance is added to the modelview matrix for a template based embodiment. The next slice from the volume is copied into the GPU memory 14 into one of the two 2D-textures. The next slices are loaded in a ping-pong or first-in, first-out manner into the two 2D textures in the GPU memory 14. Every slice is only loaded once, such as shown in the example below:

| | |
|---|---|
| 1st Slab: | load image S1 into T1, load image S2 into T2, bind T1 to TU1, bind T2 to TU2 render |
| 2nd Slab: | load image S3 into T1, bind T2 to TU1, bind T1 to TU2 render |
| 3rd Slab: | load image S4 into T2, bind T1 to TU1, bind T2 to TU2 render |
| 4th Slab: | load image S5 into T1, bind T2 to TU1, bind T1 to TU2 render |
| 5th Slab: | load image S6 into T2, bind T1 to TU1, bind T2 to TU2 render |
| ... | |
| (i * 2)th Slab: | load image S(i * 2 + 1) into T1, bind T2 to TU1, bind T1 to TU2 render |
| (i * 2 + 1)th Slab: | load image S(i * 2 + 2) into T2, bind T1 to TU1, bind T2 to TU2 render |

Back-to-front compositing within each slab uses back to front sorting of transparent geometry. Respectively, front-to-back compositing uses front to back sorting of transparent geometry. For orthographic projections, the slabs are sorted in increasing or decreasing z-order. For perspective projections, the slab texture strips are sorted according to the z-coordinate of the camera in model space. Because each slab has a certain range along the z-axis (the axis substantially parallel with the two dimensional images bounding the slab, the slab with the model space z-coordinate of the camera in its range is rendered first for front-to-back compositing or last for back-to-front compositing. The other slabs are rendered in the order of increasing distance from the first slab for front-to-back compositing or decreasing distance from the last slab for back-to-front compositing.

The display 18 is a CRT, LCD, projector, plasma, or other now known or later developed display device. The display 18 generates an image or sequence of images during or after the data is rendered. The image is a three dimensional representation, such as a two dimensional image rendered from a user or processor selected viewing direction. The display 18 is part of a local system 10 or is remote, such as a networked display.

Figure 2:
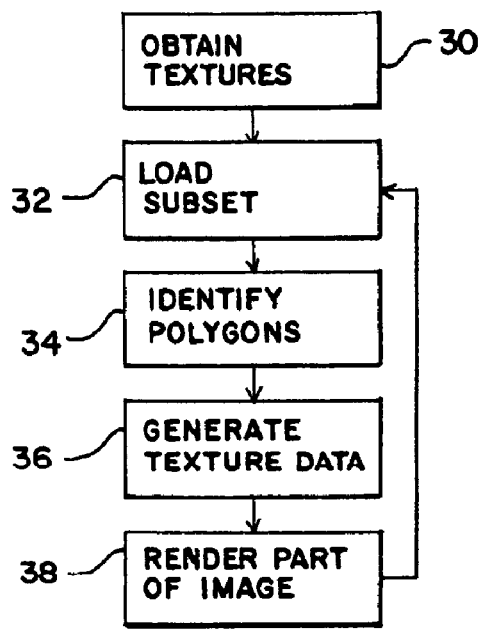
FIG. 2 is a flow chart diagram of one embodiment of a method for generating texture data and volume rendering.

FIG. 2 shows a method for generating data for volume rendering and for volume rendering from two dimensional textures. The method is implemented using the system 10 of FIG. 1 or a different system. The same or different order of acts 30-38 may be used. Additional, different or fewer acts may be used. For example, act 36 is performed without act 38. As another example, act 34 corresponds to identifying an area, strip or slab, not necessarily a polygon.

Figure 3:
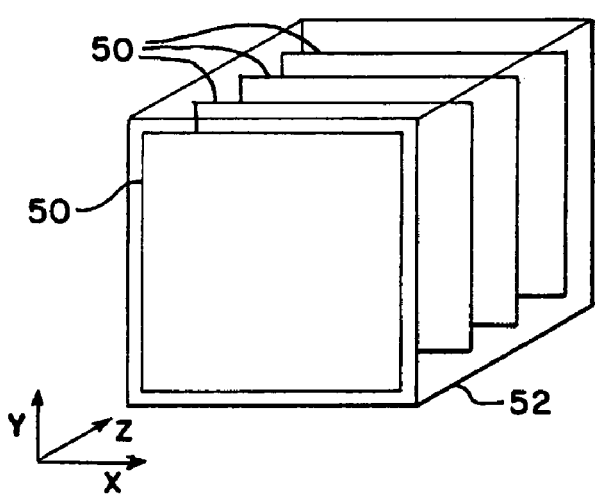
FIG. 3 is a graphical representation of an array of two dimensional images representing a volume.

In act 30, a plurality of two dimensional textures is obtained. FIG. 3 shows a plurality of two dimensional images 50 representing a volume 52. The two dimensional images are textures in a three-dimensional volume array of data assembled from a regular succession of adjacent images 50 through the body being scanned. Each image 50 is a two-dimensional image array of data points. Each grid value of a two-dimensional image 50 is a picture element, or "pixel". Each grid value of the three-dimensional volume array is called a volume element, or "voxel." The three-dimensional volume array is obtainable from magnetic resonance (MR) imaging systems, computed tomography (CT) scanning systems, positron emission tomography (PET), x-ray, ultrasound scanning or other systems. Alternatively or additionally, the volume array is obtained from a memory, database, network, input connection or other source.

The two dimensional images 50 are generally at a first orientation, such as being substantially orthogonal to a z-axis or dimension. If the volume 52 is viewed along an x or y-axis or dimension, the two dimensional images 50 appear substantially as lines. The images 50 have uniform or non-uniform spacing. For example, the distance between each adjacent pair of images 50 varies or is the same. As shown, the images 50 are in parallel planes. In other embodiments, the images 50 are in intersecting planes that intersect within or outside of the volume 52, such as associated with a scan of the volume 52 performed by rotating the scanner about an axis. The images 50 have a same or different scaling. For example, some images 50 are acquired with a lesser resolution, such as images 50 at the extremities of the volume 52. Other images 50 are acquired with a higher resolution, such as images 50 intersecting a region of interest in the volume 52.

In act 32, a subset of the volume array is loaded into a memory or processor. Different subsets of the plurality of two dimensional images are sequentially selected. Each subset includes any number of the two dimensional images, such as immediately adjacent pairs. A selection window is progressively slid over the image data to select each subset. The first subset includes the first or last images 50 of the volume 52 along the z-axis, but images 50 from the center or other location in the volume 52 may be selected first.

In one efficient embodiment, each subset is formed by loading only part of the subset. Only a single image is loaded at a time. In a sequence of images 1, 2, 3 ... N, the first subset of images 1 and 2 are loaded. For the second subset of images 2 and 3, the image 1 is replaced with the image 3. Alternatively, subsets with generally adjacent images (e.g., 1 and 3) or subsets with three or more images are used.

For each subset of images, the space between the current adjacent images (a slab) is to be rasterized. For object-aligned slicing and a dominant viewing direction along the z-axis (see FIG. 3), the images 50 are employed to rasterize this space. Object-aligned slicing and rendering from two dimensional textures along the z-axis provides a three dimensional representation. Tri-linearly interpolated, intermediate slices may be rendered as well. For viewing directions more along the x or y-axes, direct texture rendering from the two dimensional images may result in a blocking or undesired appearance.

Figure 4:
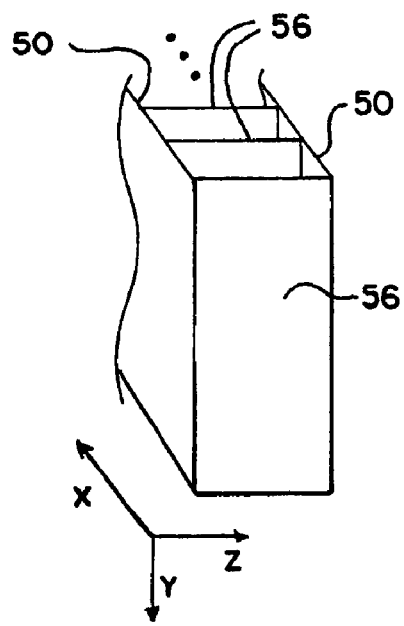
FIG. 4 is a graphical representation of interpolating texture data on a plurality of polygons extending between a pair of two dimensional images.

For rendering along the x or y-axes, polygons or areas extending as strips between adjacent two dimensional textures are identified in act 34. For example, FIG. 4 shows two images 50 oriented generally for a viewing direction along the x axis. A plurality of polygons 56 are identified in substantially parallel planes extending between the same adjacent two dimensional textures or images 50. In alternative embodiments, only a single polygon 56 is identified. The polygon 56 is cropped by the two images 50 bounding or defining the slab. The polygons 56 are non-parallel with the images 50, such as being in planes generally perpendicular to the images 50. The polygons 56 have uniform or varying spacing while being parallel or non-parallel with each other. For a dominant viewing direction along either the x- or y-axes, polygons 56 are rendered in a back-to-front or front-to-back order.

The polygon 56 is identified based on the proxy geometry known from object-aligned or view-aligned slicing. In one embodiment, the vertices of each polygon 56 are determined based on the spatial relationship of the images 50, such as the first polygon 56 having vertices along the extremes of the outer edges of the images 50. For object-aligned slicing, a number of elongated rectangles or strips result. In view-aligned slicing, a set of polygons with 3 to 6 vertices results. The xy-texture coordinates at the vertices of these polygons represent the position of the vertex on the images 50, while the z-texture coordinate is assigned to 0 for all vertices that lie in the plane of the first image 50 of the slab and to 1 for all vertices lying in the plane of the second image 50. In one variation, the polygons 56 are perpendicular to the images 50, but do not align with the outer edges of the images, such as where the images are curved or not parallel with the edge of the volume 52. In an alternative embodiment, the vertices of each polygon 56 are identified at least in part as a function of a viewing direction, such as orienting the polygons 56 at a non-perpendicular angle to one or both of the images 56 to be more orthogonal to a viewing direction.

A plurality of slabs and associated polygons are sequentially identified for different subsets of the images 50. For each subset, polygons 56 are identified. The polygons 56 of each slab or subset are independent of each other or are determined as a function of polygons 56 from other slabs or subsets. For example, a set of polygon 56 for a first slab or subset of images 50 is calculated. The polygons 56 are then translated for a second, different slab or subset. The translated polygons 56 are used as the polygons for the different slab. For efficient volume rendering, the slab polygon proxy geometry is pre-computed. Template geometry for rasterizing the space in between two adjacent images 50 is generated and stored. For slices with constant inter-image distance and image scaling the same template geometry can be reused. The template geometry is shifted from slab to slab along the z-axis by multiplying the modelview matrix with a translation matrix that accounts for the shift. For object-aligned slicing, the template geometry is of a stack of elongated rectangles. Such template geometry is pre-computed once for a given sampling rate. Each of the three main dominant viewing directions uses a separate template geometry. For view-aligned slicing, the template geometry is computed for each new viewing direction. However, the slicing geometry for the first slab may be reused for the subsequent slabs by adding a translation into the modelview matrix. Computing the translation may be less computationally burdensome than computing the polygons 56 independently.

Another example of polygons 56 being related between slabs uses clip planes. Substantially parallel, non-coplanar polygons corresponding to three or more of the adjacent two dimensional textures are identified. Proxy geometry used in view-aligned volume slicing is employed. In order to limit the rasterization to the space in between two or a fewer number of adjacent images 50, one or more, such as a pair, of clip planes are established. Each clip plane lies in the plane of one of the two images 50 defining the slab, each with different orientation to clip away the space outside the slab. During rendering, the same proxy geometry obtained from traditional view-aligned slicing is rendered again and again for each slab. The clip planes are adjusted for each of the slabs to ensure only the slab is rasterized.

In act 36, texture data is generated for the polygons 56. The texture data represents an area or strip more orthogonal to a viewing direction than the two dimensional textures or images 50. The texture data represents an area, the polygon 56, between two dimensional textures. Different texture data is generated for each of the different polygons 56 and associated slabs or subsets. By generating texture data on polygons 56 that are non-parallel with the images 50, texture data for rendering is provided.

The texture data is generated by interpolation for a given polygon 56. The texture data is interpolated from data of the two dimensional textures intersecting the polygon 56. The data from adjacent two dimensional textures of the volume 52 is used to provide the texture for the polygon 56. The data at the intersection is interpolated. For example, texture data is interpolated for the polygon 56 with vertices on the edges of the images 50 shown in FIG. 4. The image data along the edges is selected. For each location on the polygon 56 to have data, the data values from the two nearest locations on the edges of the images 50 (intersection of the polygon 56 with the images 50) are interpolated with weights. The weights represent the relative contribution of each image 50 to the interpolation, such as being a function of distance from the data location on the polygon 56. The interpolation is provided for texture data with any desired resolution, such as associated with an amount of zoom. The interpolation is performed for each spatial location in the polygon 56 to generate texture data with a desired resolution for the strip. Additional interpolation may be provided where a value for a given image 50 is interpolated from two values along the intersection.

In one embodiment, the texture data for the strip is bi-linearly interpolated from both images 50 substantially simultaneously or as part of one function. During rasterization, texture-coordinates are interpolated inside the proxy geometry, and the x- and y-coordinates are used to access the volume data, resulting in a bi-linear interpolated sample of the volume data. In another embodiment, two different sets of texture data are formed. One set corresponds to interpolating to the polygon 56 from only one of the images 50, such as blending the values from the image 50 with 0 values. Another set of texture data using the other image 50 is also generated. The two sets are then combined, such as averaging. The averaged set of texture data represents the polygon 56 blended from both images 50.

Texture data is generated for each polygon 56 of a slab. For example, separate textures are generated for each of a plurality of strips between two textures. The interpolated textures data represents different substantially parallel planes intersecting the images 50.

In act 38, an image is rendered from the texture data for the polygons 56. To tri-linearly interpolate volume data for the slab, two adjacent images 50 from the volume are loaded into CPU or GPU memory. The texture data for each polygon of the slab is bi-linearly interpolated from the volume using xy-texture coordinates. Those two bi-linearly interpolated values are weighted using the interpolated z-texture coordinate. This results in a tri-linear interpolated or rendered volume sample. The texture data of the polygons 56 is used to render a portion of the three dimensional representation of the volume 52. Texture rendering is provided with two-dimensional images and without copies of the data for each dimension.

The rendering is for any viewing direction without generating copies of data representing the volume at a different orientation than the first orientation, such as the z-axis orientation shown in FIG. 3. For viewing direction oriented rendering, the data along viewing directions or lines is combined. Where the viewing lines pass through more than one slab, partial combinations are provided. As texture data is generated for subsequent slabs, the corresponding partial combinations are combined.

Any rendering technique using the texture data may be used, such as indirect or direct volume rendering techniques. For example, a maximum, minimum, average or other intensity projection rendering is performed. Color and/or opacity values may be interpolated for rendering along the desired direction. While indirect methods generate and render an intermediate representation of the volume data, direct methods display the voxel data by evaluating an optical model which describes how the volume emits, reflects, scatters, absorbs and occludes light. The voxel values are mapped to physical quantities which describe light interaction at the respective points in 3D-space. During image synthesis, the light propagation is computed by integrating light interaction effects along viewing rays based on the optical model.

Texture-based volume rendering approaches include view-aligned or object-aligned methods depending on the orientation of the proxy geometry. For view-aligned slicing, the proxy geometry is oriented orthogonal to the viewing direction of a virtual camera. The volume data is represented by a block of voxel data (3D texture). For object-aligned slicing, the proxy geometry is oriented orthogonal to the three main axes of the volume. A large number of view- or object aligned slices through the volume of voxel data are reconstructed during rendering using the proxy geometry.

The basic approach of object-order rasterization rendering algorithms, such as implemented in consumer graphics hardware, is based on the scan-conversion of primitives (polygons, lines, points). Data values generated during scan-conversion (fragments) are blended into the frame buffer. Since volume data does not consist of such primitives per se, the proxy geometry is defined for each individual slice through the volume data. Each slice is textured with the corresponding data from the volume. The volume is reconstructed during rasterization on the slice polygon by applying a convolution of the volume data with a filter kernel. The entire volume can be represented by a stack of such slices.

The texture rendering is performed free of resampling the array of two dimensional textures or images 50. Traditional algorithms use volume data on a uniform Cartesian grid, requiring the volume data to be re-sampled. While resampling may be used, resampling may be avoided because the space between two adjacent images 50 is filled with polygons that can have an arbitrary scaling along the z-axis. The volume data is automatically scaled along the z-axis by rendering slab polygons that fill the space in between two adjacent images. The interpolation-factor assigned to the z-texture coordinate ensures proper scaling of the volume data along the z-axis.

Volume data with non-uniform image-scaling may be used for texture rendering. The space in between two adjacent images 50 is filled with polygons that can have an arbitrary scaling along the x- and y-axis. A simple scaling factor in the texture and modelview matrices ensures proper scaling of the slices. If the two images 50 do not have uniform scaling, the polygons are scaled to rasterize the maximum extents of both images 50. The texture coordinates for vertices on one or the other image 50 are assigned to account for the different scaling of the two images. The border policy of the adjacent images 50 is set to zero (i.e. values fetched from outside the image boundary are assigned zero values).

Each slab is rendered. The rendering of a slab corresponds to rendering one area of the three dimensional representation. The area corresponds to the volume between the images 50 defining the slab. The polygons 56 define the extent of the slab and resulting area being rendered. Where clipping is used, the polygons are clipped to correspond to the desired area or slab. The clipping results in the polygons 56 being limited to a fewer number of adjacent two dimensional textures than without clipping.

FIG. 2 shows a feedback loop from act 38 to act 32. The obtaining of a subset of act 32, identifying polygons of act 34, generating texture data of act 36 and texture rendering of act 38 are repeated for each of a plurality of pairs or other subsets of two dimensional textures. Each repetition corresponds to rendering a different strip or area of a three dimensional representation. Different portions of the image are rendered sequentially as a function of the different subsets. Different areas of the two dimensional image representing the volume are rendered as a function of different ones of the strips corresponding to different sets of the adjacent two dimensional textures. By sequentially loading different subsets of images, a three dimensional representation is texture rendered with less memory required than for rendering the entire volume at once.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for generating data for volume rendering, the method comprising:

obtaining at least first and second two dimensional textures; and generating texture data more orthogonal to a viewing direction than the two dimensional textures from the first and second two dimensional textures, the texture data representing a first strip between first and second two dimensional textures;

wherein generating texture data comprises generating texture data representing the first strip between the first and second two dimensional textures, the first and second two dimensional textures being spatially adjacent each other in a sequence of two dimensional textures, the first strip non-parallel with the first and second two dimensional textures: and wherein generating texture data comprises generating texture data for each of a plurality of strips, including the first strip, between the first and second two dimensional textures, the plurality of strips being on different substantially parallel planes intersecting the first and second two dimensional textures.

2. The method of claim 1 wherein obtaining comprises sequentially obtaining different subsets of a plurality of two dimensional images, the first and second two dimensional textures corresponding to a first of the different subsets;

wherein generating texture data comprises generating, for each different subset, texture data representing the strips, the strips being non-parallel with the two dimensional images of each different subset.

3. The method of claim 1 wherein generating texture data comprises interpolating from data of the first and second two dimensional textures intersecting a polygon corresponding to the first strip.

4. The method of claim 3 wherein interpolating comprises interpolating a first set of the texture data to the first strip from the first two dimensional texture, interpolating a second set of the texture data to the first strip from the second two dimensional texture and combining the first and second sets of texture data.

5. The method of claim 1 wherein the first and second two dimensional textures represent a volume at a first orientation; further comprising: texture rendering a three-dimensional representation as a function of the texture data representing the first strip, the rendering being for any viewing direction without generating copies of data representing the volume at a different orientation than the first orientation.

6. The method of claim 2 wherein obtaining comprises obtaining the different subsets with non-uniform distance, non-uniform scaling or both non-uniform distance and non-uniform scaling within the plurality of two dimensional textures; and further comprising:
texture rendering free of resampling the plurality of two dimensional textures.

7. The method of claim 1 further comprising:
texture rendering from the texture data for the plurality of the strips; and
repeating the obtaining, generating and texture rendering for each of a plurality of pairs of two dimensional textures, each repetition corresponding to rendering different strips of a three dimensional representation.

8. The method of claim 1 further comprising: rasterizing a series of slab polygons textured with the texture data.

9. The method of claim 8 wherein rasterizing the series comprises rasterizing a space between the first and second two dimensional textures; and further comprising:
sequentially repeating the obtaining, generating, and rasterizing for a different set of two dimensional textures; and
rendering a three dimensional representation image as a function of the rasterizing.

10. The method of claim 1 further comprising: setting a position of the areas as a function of the viewing direction.

11. The method of claim 1 further comprising:
rendering a three dimensional representation with the texture data for the viewing direction;
wherein generating is not performed for at least one axial viewing direction to render the three dimensional representation.

12. The method of claim 1 wherein the texture data includes at least one value representing a location in the first strip and not at an intersection of the first strip with the two dimensional textures.

13. The method of claim 1 wherein generating texture data comprises object-ordered rendering.

14. A method for volume rendering from two dimensional textures, the method comprising:
identifying polygons extending as strips between adjacent two dimensional textures, the strips being non-parallel with the two dimensional textures and being on different substantially parallel planes intersecting the two dimensional textures;
generating texture data for the polygons, wherein generating texture data comprises interpolating from data of the adjacent two dimensional textures intersecting each polygon; and
rendering an image from the texture data for the polygons.

15. The method of claim 14 wherein rendering comprises texture rendering a three dimensional representation as a two dimensional image, with different areas of the two dimensional image being rendered as a function of different ones of the strips corresponding to different sets of the adjacent two dimensional textures.

16. The method of claim 14 wherein identifying polygons comprises identifying a plurality of polygons in the different substantially parallel planes extending between the same adjacent two dimensional textures, wherein generating texture data comprises interpolating, for each polygon of the plurality of polygons, from data at intersections of the polygons with the same adjacent two dimensional textures, and wherein rendering comprises interpolating between the polygons of the plurality of polygons.

17. The method of claim 14 wherein identifying polygons comprises calculating a first polygon of the polygons for a first set of the adjacent two dimensional textures and translating the first polygon for a second, different set of the two dimensional textures, the translated first polygon being a second polygon.

18. The method of claim 14 wherein identifying polygons comprises identifying substantially parallel, non-coplanar polygons corresponding to three or more of the adjacent two dimensional textures;
wherein rendering comprises clipping the polygons to correspond to a fewer number of the three or more adjacent two dimensional textures.

19. The method of claim 14 wherein identifying comprises sequentially identifying polygons for different subsets of a plurality of the adjacent two dimensional textures;
wherein rendering comprises rendering different portions of the image sequentially as a function of the different subsets.

20. The method of claim 14 wherein the adjacent two dimensional textures represent a volume at a first orientation;
wherein rendering comprises texture rendering for any viewing direction without generating copies of data representing the volume at a different orientation than the first orientation.

21. The method of claim 14 wherein the adjacent two dimensional textures include three or more two dimensional textures with non-uniform distance, non-uniform scaling or both non-uniform distance and non-uniform scaling; and wherein rendering comprises texture rendering free of resampling the adjacent two dimensional textures.

22. A system for generating data for volume rendering, the system comprising:

a memory operable to sequentially store different subsets of a plurality of two dimensional images; and a processor operable to generate texture data on each of a plurality of strips representing substantially parallel areas between the two dimensional images of each different subset for each different subset, the substantially parallel areas being non-parallel with and intersecting the two dimensional images, the texture data for each different subset being a function from the two dimensional images of the respective different subset.

23. The system of claim 22 wherein the processor comprises a graphic processing unit.

24. The system of claim 22 wherein the processor is operable to render a three dimensional representation having different areas rendered from different strips corresponding to the different subsets.

25. The system of claim 22 wherein the memory is operable in a first-in first-out format, and the processor is operable to generate the texture data, for each pair of two-dimensional images currently stored in the memory, by identifying a plurality of substantially parallel, non-coplanar polygons extending between the pair of two-dimensional images and by interpolating data from the pair of two dimensional images on the polygons.

26. The system of claim 22 wherein the processor is operable to tri-linearly interpolate from the different subsets.

27. The system of claim 22 wherein the processor is operable to rasterize a series of the strips textured with the texture data.

28. The system of claim 22 wherein the processor is operable to set the areas as a function of the viewing direction.

29. The method of claim 14 wherein generating comprises 2D texture mapping with object-order data access achieved through the use of data- aligned polygon strips.

* * * * *